(12) United States Patent
Cook et al.

(10) Patent No.: US 9,727,921 B2
(45) Date of Patent: Aug. 8, 2017

(54) SYSTEMS AND METHODS FOR PROCESSING DAMAGE TO INSURED PROPERTIES OR STRUCTURES

(71) Applicant: STATE FARM MUTUAL AUTOMOBILE INSURANCE COMPANY, Bloomington, IL (US)

(72) Inventors: Michael K. Cook, Carlock, IL (US); Jonathan Guidry, Bloomington, IL (US); Jason O'Donnell, Bloomington, IL (US); Tim G. Sanidas, Bloomington, IL (US); Doug Dewey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 36 days.

(21) Appl. No.: 14/299,721

(22) Filed: Jun. 9, 2014

(65) Prior Publication Data

US 2015/0356686 A1 Dec. 10, 2015

(51) Int. Cl.
*G06Q 40/00* (2012.01)
*G06Q 40/08* (2012.01)

(52) U.S. Cl.
CPC .................. *G06Q 40/08* (2013.01)

(58) Field of Classification Search
CPC ....................................................... G06F 19/00
USPC ....... 705/4, 1.1, 35, 40, 7, 36; 340/540, 602, 340/539, 601; 700/284; 706/925, 52, 21, 706/60
See application file for complete search history.

(56) References Cited

U.S. PATENT DOCUMENTS

| | | | |
|---|---|---|---|
| 8,106,769 B1* | 1/2012 | Maroney ................ | G06Q 10/10 340/540 |
| 2008/0077333 A1* | 3/2008 | Maxey ................ | G08B 13/169 702/34 |
| 2009/0265193 A1* | 10/2009 | Collins .............. | G06Q 30/0185 705/4 |
| 2010/0174566 A1* | 7/2010 | Helitzer ................ | G06Q 40/08 705/4 |
| 2012/0179431 A1* | 7/2012 | Labrie ..................... | G06F 17/50 703/1 |

* cited by examiner

*Primary Examiner* — John H Holly
(74) *Attorney, Agent, or Firm* — Marshall, Gerstein & Borun LLP; Randall G. Rueth

(57) ABSTRACT

Methods and systems for processing data associated with potential damage to a portion of the property. One or more sensors may be disposed in proximity to the portion of the property, where the one or more sensors are configured to sense physical force applied to the portion. A controller module calculates mechanical force data based on the sensor data and estimates an amount of damage to the portion of the property based on the mechanical force data. In some aspects, an insurance provider can use the estimated amount of damage to perform insurance coverage functionalities, estimate damage to additional properties, maintain a damage history for the property, and notify customers of suggested improvements to the property.

8 Claims, 9 Drawing Sheets

SYSTEMS AND METHODS FOR PROCESSING DAMAGE TO INSURED PROPERTIES OR STRUCTURES

FIELD OF THE DISCLOSURE

The present disclosure generally relates to systems and methods for processing damage to structures and, more particularly, to platforms and techniques for using sensor data to estimate an amount of damage to a structure.

BACKGROUND

Customers purchase casualty insurance policies to insulate themselves from various risks posed to their property. For example, a homeowner may purchase a homeowners insurance policy or a driver may purchase an automobile insurance policy. Various "loss events" can result in damage to this property which can lead to customers filing insurance claims for the damage to collect any monies owed according to the casualty insurance policy. For example, loss events can result from hurricanes, earthquakes, severe storms, tornados, hailstorms, wildfires, and other causes.

In certain cases, it may prove difficult to accurately gauge or determine an amount of damage to a property that results from a loss event. For example, if a hail storm causes roof damage to a home, the homeowner may not be able to easily determine that damage has actually occurred. Further, if the homeowner believes that there is damage to the roof, the homeowner may require an agent, adjuster, or building inspector to determine an extent or scope of the damage.

Accordingly, there is an opportunity for systems and methods to effectively and efficiently detect when damage has occurred to a structure and estimate an amount of the resulting damage.

SUMMARY

In an embodiment, a method of detecting damage to a property is provided. The method includes collecting sensor data from at least one sensor disposed in proximity to a portion of the property, the sensor data corresponding to an electrical charge generated by the at least one sensor in response to a physical force exerted on the portion of the property. The method further includes converting the sensor data into mechanical force data, estimating, by a processor using the mechanical force data, an amount of damage to the portion of the property, and communicating the amount of damage to a server via a communications network.

In another embodiment, a system for detecting damage to a portion of a property is provided. The system includes at least one sensor disposed in proximity to the portion of the property, wherein the at least one sensor is configured to detect a physical force exerted on the portion of the property, and generate an electrical charge corresponding to the physical force. The system further includes a communication module configured to connect to a remote server via a communications network, a memory storing a set of instructions, and a processor adapted to interface with the array of piezoelectric sensors, the communication module, and the memory. The processor is configured to execute the set of instructions to retrieve sensor data from the at least one sensor, the sensor data corresponding to the electrical charge generated by the at least one sensor, convert the sensor data into mechanical force data, estimate, based on the mechanical force data, an amount of damage to the portion of the property, and cause the communication module to send the amount of damage to the remote server via the communications network.

In a further embodiment, a method of analyzing damage to properties is provided. The method includes receiving, via a communications network, sensor data detected by at least one sensor disposed in proximity to a portion of a property, the sensor data corresponding to an electrical charge generated by the at least one sensor in response to a physical force exerted on the portion of the property. The method further comprises converting the sensor data into mechanical force data, estimating, by a processor using the mechanical force data, an amount of damage to the portion of the property, and storing the amount of damage in a memory record associated with the portion of the property.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
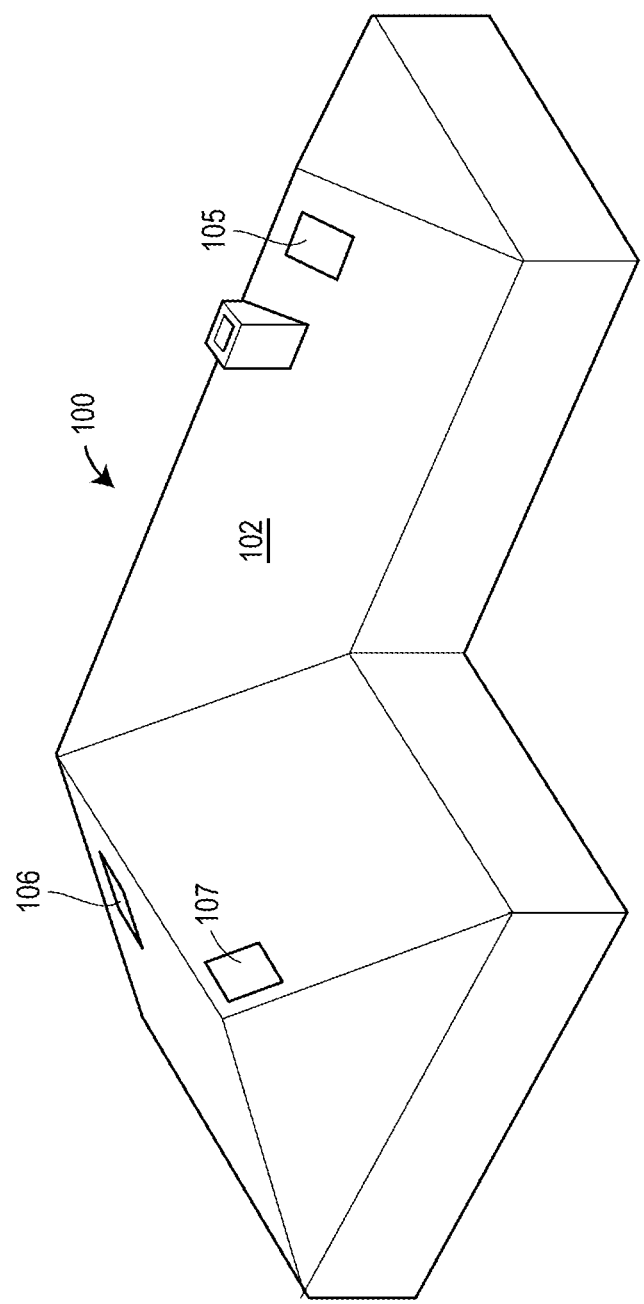
FIG. 1 depicts an example property including components associated with detecting property damage in accordance with some embodiments.

The novel systems and methods disclosed herein relate generally to detecting damage to structures, assemblies, components, or the like (generally, "properties"), estimating an amount of the damage, and communicating damage data to relevant parties. According to certain aspects, one or more portable sensor arrays are installed on the roof of a home or on the hood of an automobile, or on other parts of an insured or uninsured property, and are configured to detect forces applied to the property as a result of a loss event. For example, a thunderstorm may cause wind damage to roof shingles. The systems and methods process the sensor data to estimate an amount of damage that occurred to the property, and then communicate damage data to an insurance provider to enable effective processing of any insurance-related functionalities.

The systems and methods offer numerous benefits. In particular, data associated with any property damage (generally, "damage data") can be transmitted in near real-time data to insurance providers capable of managing any insurance policy processing. The insurance providers are thus able to respond faster to the needs of customers as well as potentially reduce the need for in-person examination by building inspectors or agents (which reduces costs and results in savings that are passed down to the customers). Additionally, the customers need not manually attempt to assess damage to a property that is generally difficult to assess. Further, insurance providers are able to automate a first notice of loss (FNL) event and pre-populate various insurance forms based on the FNL event, which results in a more efficient claim filing procedure should the customer initiate a claim filing.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

An insurance provider may offer or provide one or more different types of insurance policies. Types of insurance policies may include, for example, auto insurance; homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured.

Typically, a person or customer (or an agent of the person or customer) of an insurance provider fills out an application for an insurance policy. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

FIG. 1 depicts an example property 100 associated with embodiments as discussed herein. The property 100 is depicted as a building, however it should be appreciated that other properties are envisioned. For example, the property may be a house, a trailer, a commercial building, a vehicle, a boat, or other type of physical property. The property 100 may have an associated insurance policy through an insurance provider that covers or insures damage to the property 100. In some cases, the property 100 may otherwise be eligible for an insurance policy.

Generally, the insurance policy associated with the property 100 may cover damage to various portions, parts, or aspects of the property 100. In particular, the insurance policy may cover damage to a roof 102 of the property 100.

The roof 102 serves as the covering on the uppermost or outermost part of the property 100 and provides protection from various weather elements. For example, the weather elements may be rain, heat, sunlight, wind storms, hail storms, thunderstorms, floods, hurricanes, tornados, tsunamis, earthquakes, blizzards, wildfires, cyclones, volcanic eruptions, avalanches, and/or the like. A weather element that leads to property damage is generally referred to as a "loss event."

Although the embodiments herein describe incorporating or configuring piezoelectric sensors in various sensor arrays, it should be appreciated that other types of sensors, transducers, or the like that are capable of sensing mechanical force are envisioned. For example, the sensors may be nanotechnology-based sensors, spray-on sensors, various types of load cells such as hydraulic load cells, pneumatic load cells, or strain gauge load cells (e.g., electrical resistance strain gauges, foil strain gauges, semiconductor strain gauges, thin-film strain gauges, wire strain gauges, elastic or magneto-elastic devices, vibrating elements, dynamic devices, plastic deformation sensors, or other sensors). According to embodiments, the sensors may be singularly or multiplicatively displaced in proximity to a property such as a roof so that the sensors may detect a force applied to the property.

An outer surface of the roof 102 may be composed of various elements or combinations of elements such as asphalt shingles, wood, steel, slate, tile, or others. Because a roof is a crucial element needed to protect a building, the roof is often designed to last several years, if not decades. Accordingly, the costs associated with repairing or replacing a roof are often high. Further, property owners will often include roof damage as part of a property insurance policy. Although FIG. 1 depicts the roof 102 as associated with a building, it should be appreciated that the systems and methods can process damage data associated with other portions of other types of properties. For example, the systems and methods may process damage data associated with a hood of a vehicle, windows on a building or automobile, a room of a building, or other portions of various properties.

As illustrated in FIG. 1, the roof 102 can include a set of sensor arrays 105, 106, 107 installed thereon. Although FIG. 1 illustrates three (3) sensor arrays 105, 106, 107, it should be appreciated that the roof 102 can include other amounts of sensor arrays. Each of the sensor arrays 105, 106, 107 can include one or more piezoelectric sensors that are configured to measure pressure, strain, and/or force applied to the area of the sensor arrays 105, 106, 107. Accordingly, the piezoelectric sensors are configured to approximate the pressure, strain, and/or force that is applied to the roof 102 in the area covered by the corresponding sensor array 105, 106, 107.

The piezoelectric sensors of the set of sensor arrays 105, 106, 107 are configured to convert a sensed physical pressure into an electric charge (i.e., a voltage). According to embodiments, a processing or controller module associated with the set of sensor arrays 105, 106, 107 can be configured to convert the electric charge data from the piezoelectric sensors into mechanical force data. The controller module can further use the mechanical force data to estimate an amount of damage sustained by the roof 102 over a period of time corresponding to the sensor data collection. In some embodiments, the controller module can extrapolate the calculated mechanical force data associated with the set of sensor arrays 105, 106, 107 to account for the area of the roof 102. As a result, the set of sensor arrays 105, 106, 107 need not cover the entire area of the roof 102.

Figure 2:
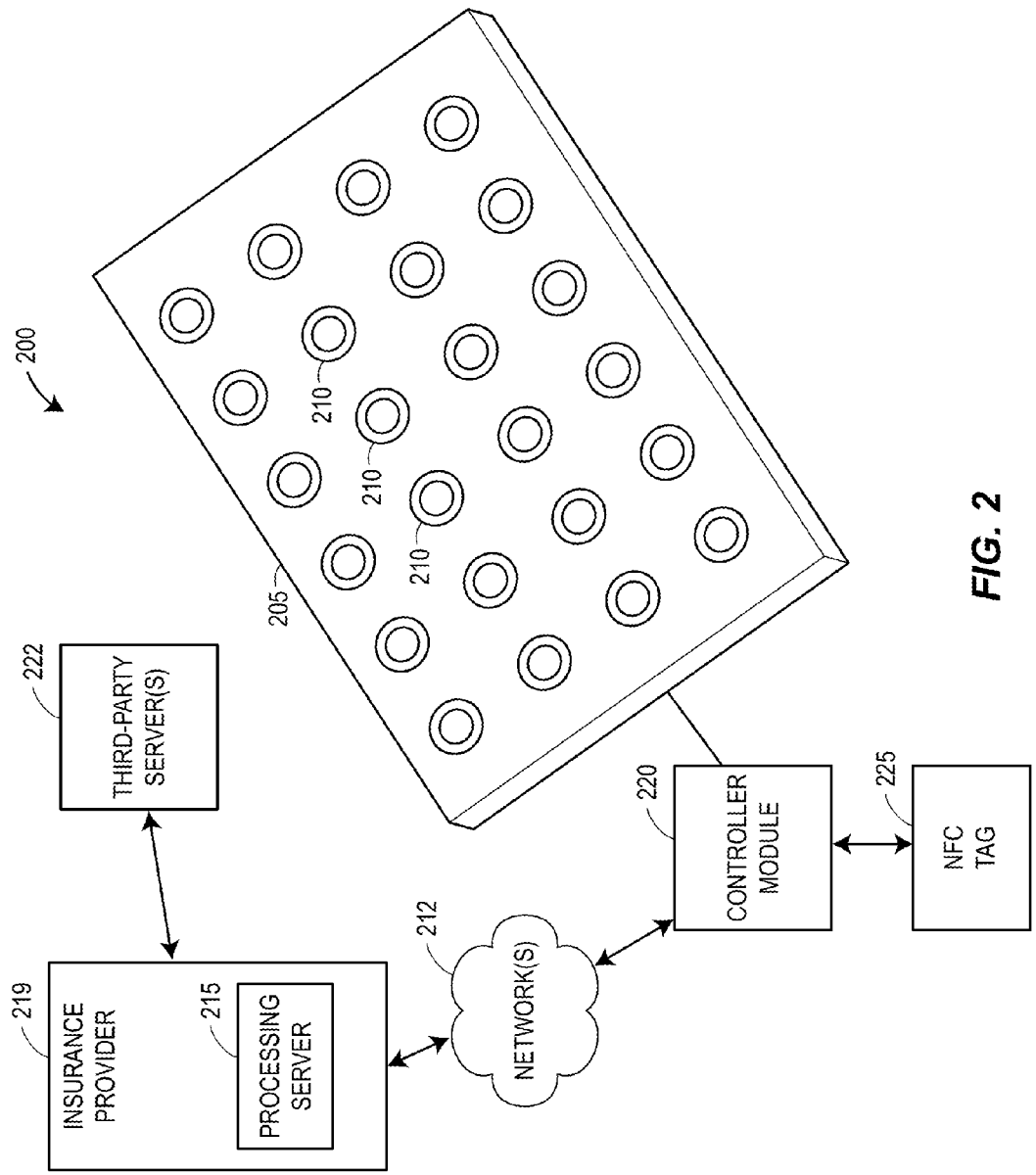
FIG. 2 depicts an example representation of components associated with detecting property damage and estimating an amount of the damage, in accordance with some embodiments.

FIG. 2 depicts a more detailed representation 200 of components configured to facilitate the damage estimation functionalities. The representation 200 depicts an example sensor array 205 including a plurality of piezoelectric sensors 210 disposed thereon. The sensor array 205 can include a housing that is composed of one or more various materials. For example, the sensor array 205 can be plywood, plastic, metal, and/or other materials. The housing of the sensor array 205 may be various sizes. For example, the housing can be three (3) feet by five (5) feet, two (2) by four (4) feet, or other sizes. The piezoelectric sensors 210 can be affixed or secured to the housing via various components or techniques.

The sensor array 205 as depicted in FIG. 2 includes a total of twenty-four (24) piezoelectric sensors 210 that are arranged in a four-by-six (4×6) array. It should be appreciated that other amounts of piezoelectric sensors that are arranged in other arrangements (e.g., 3×6, 2×8, etc.) are envisioned. The piezoelectric sensors 210 may be arranged at various distances apart from each other. For example, the piezoelectric sensors 210 can be spaced two (2) inches apart. Further, the piezoelectric sensors 210 can be of various shapes and sizes. For example, the piezoelectric sensors 210 can be circular in shape and have a diameter of 1.5 inches.

The sensor array 205 is configured to be installed on or otherwise disposed in proximity to a roof of a property (such as the roof 102 of the property 100 as discussed with respect to FIG. 1). For example, the sensor array 205 may be affixed to a roof surface whereby a roofing material (e.g., shingles) may cover the sensor array 205. Accordingly, the sensor array 205 may accurately sense force applied to the roof surface that is exposed to the exterior of the property. In some embodiments, the sensor array 205 can be disposed or located within an enclosure (not shown in FIG. 2) that may be secured to a surface of the roof of the property.

The sensor array 205, or more particularly the piezoelectric sensors 210, can be connected to a controller module 220. The controller module 220 can include a circuit board and various processing logic and memory devices configured to facilitate various calculations and other functionalities associated with the damage estimation. Although FIG. 2 depicts the controller module 220 as connected to the single sensor array 205, it should be appreciated that the controller module 220 may be connected to multiple sensor arrays that each includes a set of piezoelectric sensors. In some embodiments, each of the piezoelectric sensors 210 can be connected to the controller module 220 via a wired connection. In other embodiments, each of the piezoelectric sensors 210 can be connected to the controller module 220 via a wireless connection such as via a wireless local area network (WLAN) or a wireless personal area network (WPAN).

The controller module 220 can further connect to and communicate with a near field communication (NFC) tag 225. According to embodiments, the NFC tag 225 may store data associated with the roof and/or the property on which the sensor array 205 is disposed. For example, the NFC tag 225 can store a date of construction for the roof, a type of roof material, a construction technique, an age of the property, a location of the property, a pitch of the roof, a size of the roof, and/or other data. The NFC tag 225 can be installed or disposed on the property with the sensor array 205 or separate from the sensor array 205. For example, the NFC tag 225 may be affixed to a location near the controller module 220 so that the controller module 220 can retrieve relevant data via the short-range NFC communication.

The controller module 220 can be configured to receive data from the piezoelectric sensors 210 and/or retrieve the data stored on the NFC tag 225, and can use the received/ retrieved data to calculate/estimate the amount of damage to the roof. Because the NFC tag 225 stores data relevant to the roof and the property, the sensor array 205 need not be programmed with data specific to the roof or the property. Accordingly, multiple sensor arrays 205 may be constructed and assembled in the same manner so as to be configured for installation on various types of properties. Further, the sensor array 205 may be easily transferrable among different properties. Although the embodiments describe the tag 225 as configured for the NFC protocol, it should be appreciated that other storage devices and communication protocols are envisioned. In some embodiments, the sensor array 205 and the controller module 220 can be disposed or located within an enclosure (not shown in FIG. 2) that may be secured to a surface of the roof of the property.

The controller module 220 may also communicate with a processing server 215 via one or more networks 212 such as, for example, a wide area network (WAN), a local area network (LAN), a personal area network (PAN), or other networks. The network 212 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth). According to embodiments, the processing server 215 may be associated with an insurance provider 219. The insurance provider 219 can be any individual, group of individuals, company, corporation, or other type of entity that can issue insurance policies for customers, such as insurance policies associated with the property on which the sensor array 205 is installed. Although FIG. 2 depicts the processing server 215 as a part of the insurance provider 219, it should be appreciated that the processing server 215 can be separate from (and connected to or accessible by) the insurance provider 219. Further, although FIG. 2 depicts the processing server 215 communicatively coupled to the single sensor array 205, it should be appreciated that the processing server 215 may be connected to multiple sensor arrays 205.

The processing server 215 can also connect to one or more third-party servers 222. Although FIG. 2 depicts the third-party server(s) 222 as separate from the processing server 215, it should be appreciated that the third-party server(s) 222 can be a part of the processing server 215. The processing server 215 can connect to the third-party server(s) via the network 212 or via another connection. According to embodiments, the third-party server(s) 222 can include data from news sources (e.g., national news networks, regional news networks, newspapers, magazines, news websites), data from weather sources (e.g., the National Oceanic and Atmospheric Administration; other federal, state, or local governmental weather bureaus; commercial weather services; weather websites), data from governmental sources (e.g., the Department of the Interior, the Department of Homeland Security, other federal, state, and local governmental sources), data from social networks (e.g., Facebook®, Twitter®, Google+®, Instagram®), data from public databases, data from private databases (e.g., consultants, data miners, surveyors), or other sources. Herein, such data from the third-party server(s) may be collectively referred to as "third-party data," and can include loss event data relating to one or more loss events that have happened (e.g., a lightning strike), are happening (e.g., a flood), or may happen in the future (e.g., a forecasted hurricane).

Figure 3:
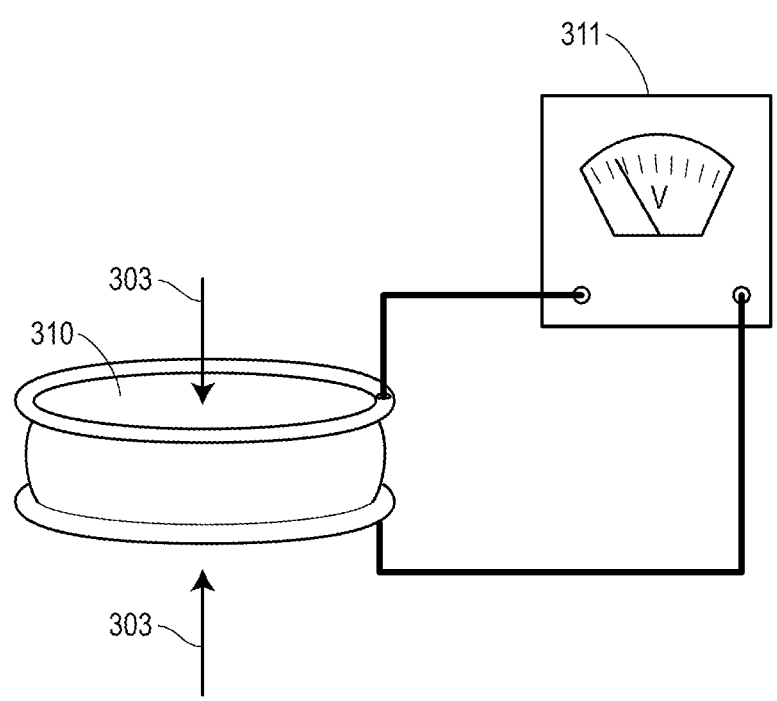
FIG. 3 depicts an example sensor used for detecting property damage in accordance with some embodiments.

FIG. 3 is a detailed depiction of an example piezoelectric sensor 310. According to embodiments, multiple of the piezoelectric sensors 310 may be arranged in a sensor array, such as the sensor array 205 as discussed with respect to FIG. 2. Generally, the piezoelectric sensor 310 may be composed of piezoelectric ceramics and/or single crystal materials, although it should be appreciated that other materials are envisioned. It should further be appreciated that the relative dimensions and properties of the piezoelectric sensor 310 are exemplary and that other dimensions and properties are envisioned.

In operation, one or more forces 303 may be applied to the piezoelectric sensor 310. In response to the forces 303, the piezoelectric sensor 310 can deform which causes the piezoelectric sensor 310 to generate a voltage (as illustrated by a voltmeter 311). When the piezoelectric sensor 310 is included in a sensor array that is disposed in proximity to a roof, for example, the piezoelectric sensor 310 can deform in response to a force such as hail or wind and can generate a resulting voltage. Generally, the greater the forces 303 that are applied to the piezoelectric sensor 310, the higher the voltage that is generated by the piezoelectric sensor 310. Therefore, the greater the force caused by hail, wind, or the like, the greater the voltage generated by the piezoelectric sensor 310 in response to the sensed force. Although not shown in FIG. 3, the piezoelectric sensor 310 may be connected to a circuit with one or more resistors in parallel or a series, where the resisters may have varying degrees of resistance.

Figure 4:
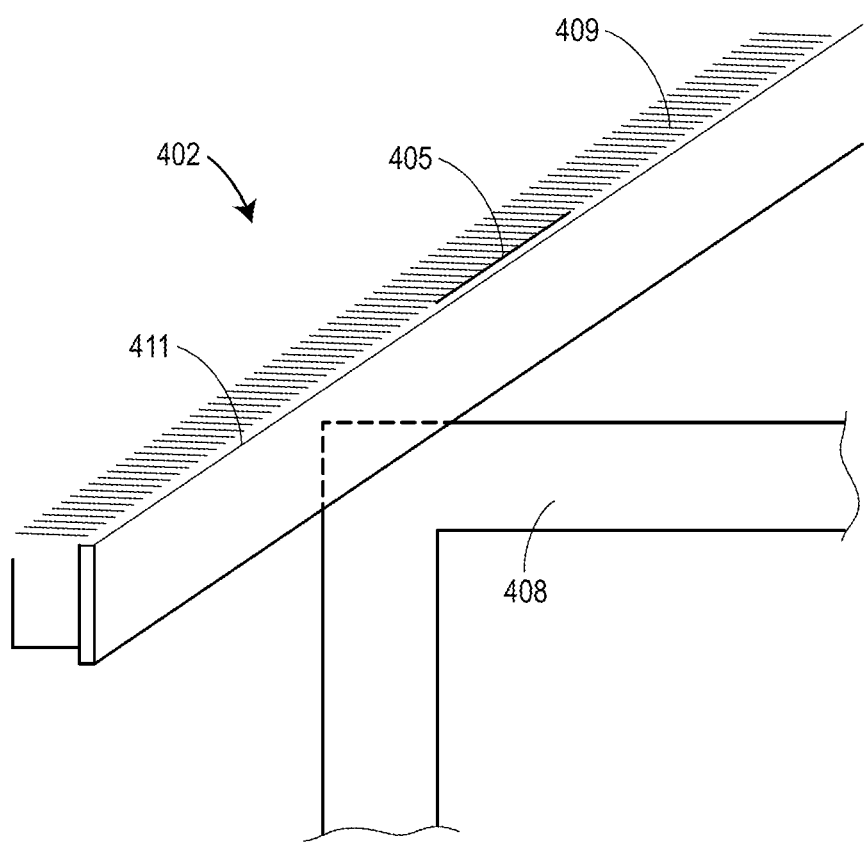
FIG. 4 is a cross-section view of a property including components associated with detecting damage in accordance with some embodiments.

FIG. 4 illustrates an exemplary roof 402 on which a sensor array 405 may be installed or disposed. The roof 402 as illustrated in FIG. 4 is a standard pitched roof with interior support components 408, however is should be appreciated that other types of roofs are envisioned. The sensor array 405 may be affixed or secured to an exterior surface 411 of the roof 402 via various components or techniques (e.g., nails, glue, hook-and-loop fasteners, etc.). Roofing material 409, such as shingles, can cover the sensor array 405 so as to protect the sensor array 405 (and the roof 402 in general) and so that the sensor array 405 is positioned to detect exterior forces on the roof 402.

Figure 5:
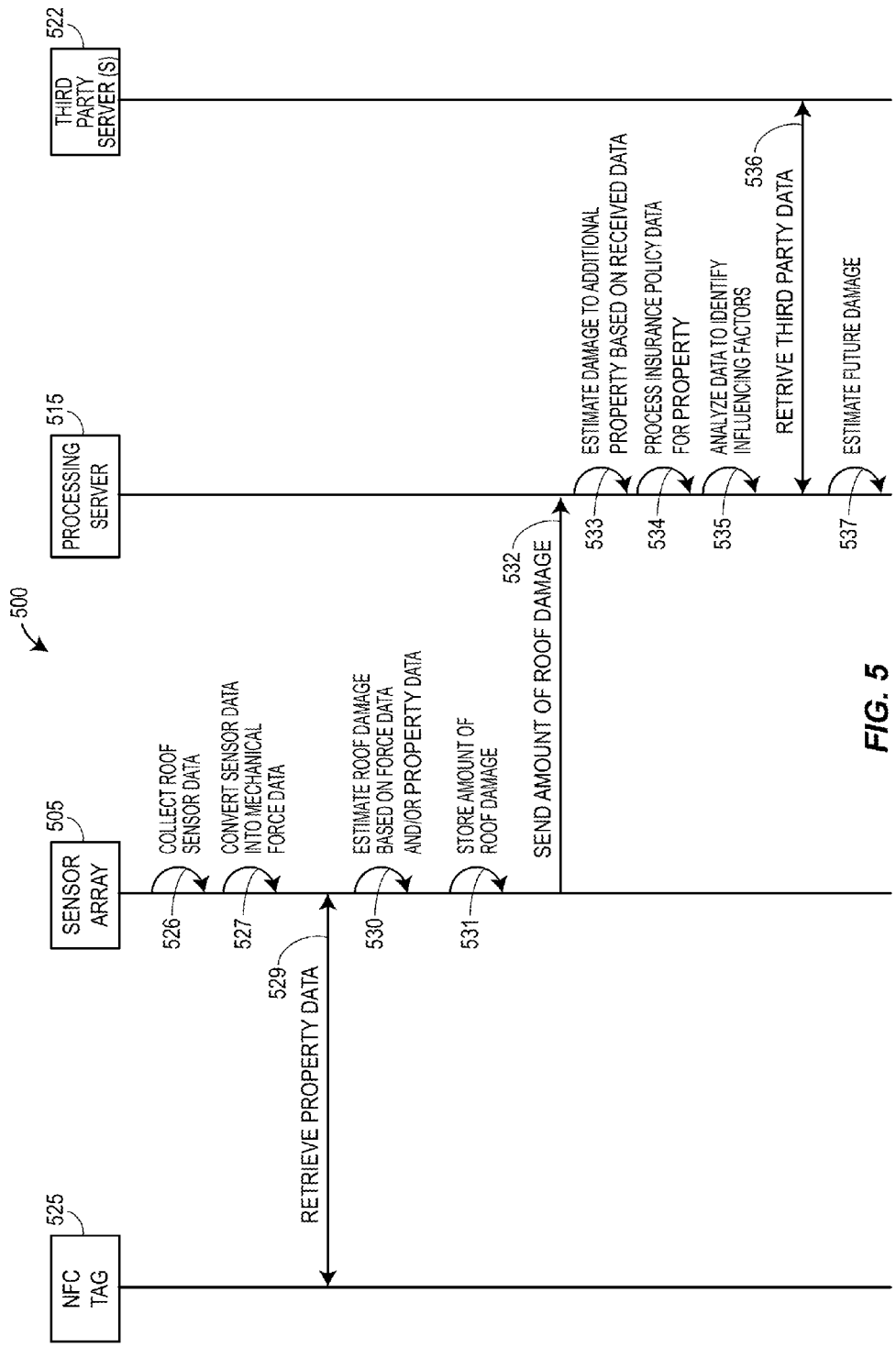
FIG. 5 depicts a signal diagram associated with detecting property damage and estimating an amount of the damage, in accordance with some embodiments.

Referring to FIG. 5, depicted is a signal diagram 500 illustrating techniques for processing piezoelectric sensor data and performing various insurance-related functionalities according to the processed data. In particular, FIG. 5 includes an NFC tag 525 (such as the NFC tag 225 as described with respect to FIG. 2), a sensor array 505 including an array of piezoelectric sensors as well as a controller module (such as the sensor array board 205 as discussed with respect to FIG. 2), a processing server 515 associated with an insurance provider (such as the processing server 215 as discussed with respect to FIG. 2), and one or more third-party servers 522 (such as the third party server(s) 222 as discussed with respect to FIG. 2). According to embodiments, the sensor array 505 is installed or disposed in proximity to a roof of a property. However, it should be appreciated that the sensor array 505 may be installed to other various portions of various properties.

The processing of the signal diagram 500 can be triggered by or initiated when piezoelectric sensors of the sensor array 505 detect or sense a force. For example, a strong wind or hail can impact the roof of the property which causes the piezoelectric sensors to deform and generate a corresponding amount of voltage. The sensor array 505 therefore collects (526) roof sensor data in the form of analog voltage readings from the piezoelectric sensors.

The sensor array 505 also converts (527) the sensor data into mechanical force data. According to some embodiments, the sensor array 505 can first convert the analog voltage readings into resistance units (i.e., Ohms) based on the resistance of the piezoelectric sensors. The sensor array 505 can also convert the calculated resistance into conductance (i.e., the inverse of the resistance). Further, the sensor array 505 can convert the conductance into mechanical force (i.e., Newtons). In some embodiments, the sensor array 505 may use the following formulas in the conductance to mechanical force calculation:

Mechanical Force=Conductance/80 if Resistance is above 1 kilohm    (1)

Mechanical Force=Conductance/30 if Resistance is equal to or below 1 kilohm    (2)

The sensor array 505 can retrieve (529) property data from the NFC tag 525. For example, the property data can include a date of construction for the roof, a type of roof material, a construction technique, an age of the property, a location of the property, a pitch of the roof, a size of the roof, and/or other data. In embodiments, the property data can influence the estimated amount of damage to the roof. For example, older roofs may damage easier than newer roofs, in general. Further, for example, certain roofing materials are more susceptible to damage than other roofing materials. In some embodiments, the sensor array 505 can extrapolate the calculated mechanical force data using size data retrieved from the NFC tag 525 to account for the entire surface area of the roof. In particular, the sensor array 505 can identify a ratio between an area taken up by the sensor array 505 and a surface area of the roof, and can multiply the mechanical force data by this ratio to calculate a total amount of mechanical force that is exerted across the surface area of the roof.

The sensor array 505 can estimate (530) an amount of damage to the roof based on the mechanical force data and/or property data. In particular, the sensor array 505 can cross-reference the mechanical force data (i.e., the estimated total amount of force across the surface area of the roof) with various property data parameters to estimate the amount of damage. It should be appreciated that various algorithms, calculations, and techniques may be employed by the sensor array 505 to perform the estimation. In some embodiments, the sensor array 505 can store coefficients associated with the property data that the sensor array 505 can use to perform any calculations or estimations. For example, asphalt shingles may have a damage coefficient of 0.8 and tile shingles may have a damage coefficient of 1.1. In some other embodiments, the sensor array 505 can leverage historical data (e.g., data associated with previously-occurring weather events and damage amounts resulting therefrom) to estimate the amount of damage or refine the estimated amount of damage. In some embodiments, the estimated amount of damage may be quantitative (i.e., a numeric measurement). In other embodiments, the estimated amount of damage may be qualitative (e.g., "low," "medium," "high," etc.).

The sensor array 505 can store (531) the estimated amount of damage to the roof in a memory record associated with the roof. In embodiments, the sensor array 505 may create and store multiple entries corresponding to damage amounts for the roof that are estimated at different times (and, presumably after multiple weather events). Accordingly, the memory record may serve as a historical record of damage sustained by the roof of the property over time. The sensor array 505 can send (532) the estimated amount of roof damage (or the memory record itself) to the processing server 515 via a communications network. For example, the sensor array 505 may communicate the estimated amount of roof damage using the internet via a LAN established in the property. In some embodiments, the sensor array 505 can be configured to store the estimated amount of damage (as well as any previously-recorded data) until the sensor array 505 is able to connect to the processing server 515. When the sensor array 505 is able to establish a communication with the processing server 515, the sensor array 505 may automatically send the estimated amount of damage and/or the memory record indicating one or more roof damage entries.

According to embodiments, the processing server 515 may perform various calculations on the received data and facilitate various functionalities using the received data. In one embodiment, the processing server 515 can estimate (533) an amount(s) of damage to additional property(ies) based on the received data, where the additional property(ies) may not have their own sensor arrays. The additional property(ies) can be located in proximity to the structure associated with the sensor array 505, so that the additional property(ies) are likely to be impacted by the same weather event that caused the sensor array 505 to detect a force. Additionally, the additional property(ies) may be covered by insurance policies offered by the insurance provider associated with the processing server 515. For example, the processing server 515 can identify any additional properties with active insurance policies that are located within a half mile radius of the property associated with the sensor array 505, can retrieve relevant data associated with the additional properties (e.g., roof size, construction year, roofing materials, etc.), and can estimate damage amounts to the roofs of the additional properties based on an analysis including the data received from the sensor array 505 and the data associated with the additional properties.

In another embodiment, the processing server 515 can process (534) data associated with an insurance policy of the property. In some cases, the processing server 515 may recommend increasing coverage on an existing insurance policy of the property, for example to account for the estimated amount of damage. In other cases, for example if the property is not covered by an insurance policy, the processing server 515 may generate a sample insurance policy for the property. This scenario may be useful, for example, in selling a potential customer on the merits of an insurance policy whereby the insurance provider can install the sensor array 505 on the property of the potential customer.

In further cases, the processing server 515 may analyze the received data to identify influencing factors that may contribute to roof damage. In particular, the processing server 515 may analyze the received data in an effort to become "smarter" so that future damage detection events can be more efficient and accurate. The processing server 515 may compare the received data with existing sensor data as well as damage data (and/or filed insurance claims) to determine what kinds of recorded sensor readings may lead to insurance claim filings. The processing server 515 can also store the received data and any analysis of the received data in storage for later retrieval and/or analysis.

In still further cases, the processing server 515 can retrieve (536) third party data from the third party server(s) 522. In particular, the third-party data can relate to upcoming, forecasted, occurring, or recently occurred loss events that may cause damage to the roof of the property. The processing server 515 can reconcile the third-party data with the data received from the sensor array 505 to potentially correct or modify any damage amounts. Further, the processing server 515 may use the third-party data to pre-fill an insurance form associated with an insurance claim for a customer having an insurance policy for the property. In particular, the processing server 515 can pre-fill the insurance form to indicate the estimated amount of damage along with any filing codes or other insurance claim filing requirements. The processing server 515 can also provide the pre-filled insurance form to the customer for review, modification, and/or submittal. In this way, the customer need not fill out at least a portion of an insurance claim that claims the damage experienced by the roof of the property. In cases in which an upcoming or forecasted event has not yet occurred, the processing server 515 can estimate (537) an amount of upcoming damage that the roof may experience by the upcoming or forecasted event. Accordingly, the processing server 515 may be able to adequately prepare for a loss event that can lead to insurance claim filings or other effects of a loss event.

Although not depicted in FIG. 5, it should be appreciated that the processing server 515 may also perform any calculations associated with the sensor data. In particular, the sensor array 505 can collect the roof sensor data and send the raw sensor data to the processing server 515. The processing server 515 may then perform any conversions, calculations, or estimations associated with the raw sensor data. The processing server 515 can also access the property data locally or from another entity, as well as maintain a memory record indicating a damage amount history for the property.

Figure 6:
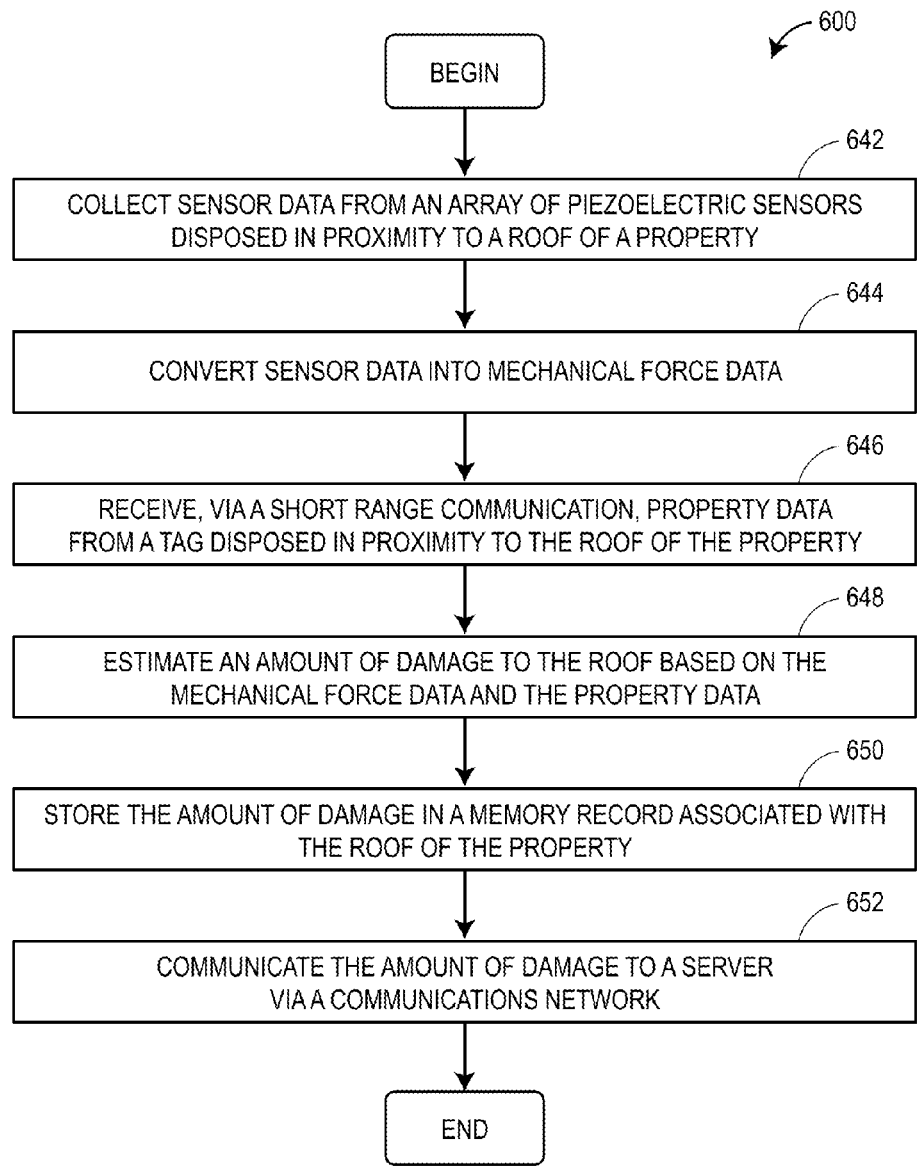
FIG. 6 depicts a flow diagram of detecting property damage and estimating an amount of the damage, in accordance with some embodiments.

Referring to FIG. 6, depicted is a flow diagram of an example damage estimation technique 600 implemented in a sensor array (or more particularly, by a controller module of the sensor array), such as the sensor array 205 as discussed with respect to FIG. 2. The sensor array may implement the technique 600 to estimate an amount of damage to a roof of a property resulting from a loss event. However, it should be appreciated that the sensor array may estimate damage to other various portions of various properties in a similar manner.

The sensor array can collect (block 642) sensor data from an array of piezoelectric sensors disposed in proximity to a roof of a property. The sensor data can include analog voltage measurements generated by the piezoelectric sensors in response to detecting a physical force. The sensor array can convert (block 644) the sensor data into mechanical force data. In particular, the sensor array can convert the voltage measurements into a resistance measurement, then into a conductance measurement, and then into mechanical force data.

The sensor array can receive (block 646), via a short range communication, property data from a tag disposed in proximity to the roof of the property. In some cases, the tag may be an NFC tag that stores a date of construction, a type of roof material, a construction technique, an age of the property, a location of the property, a pitch of the roof, a size of the roof, and/or other data. The sensor array can estimate (block 648) an amount of damage to the roof based on the mechanical force data and the property data. In embodiments, the sensor array may use one or more techniques or algorithms to estimate the amount of damage. For example, a certain mechanical force measurement may correspond to a certain estimated amount of damage. In some embodiments, the sensor array may extrapolate the calculated mechanical force data to account for a surface area of the roof (which may be contained in the property data, in embodiments).

The sensor array can store (block 650) the amount of damage in a memory record associated with the roof of the property. In embodiments, the memory record may include a listing of estimated damage amounts that the sensor array has calculated over a period of time. The sensor array can communicate (block 652) the amount of damage to a server via a communications network. The server can be a remote server associated with an insurance provider. In some embodiments, the sensor array can store the amount of damage in a memory device until a network connection is detected and, when the network connected is detected, can transmit the amount of damage to the server via the network connection.

Figure 7:
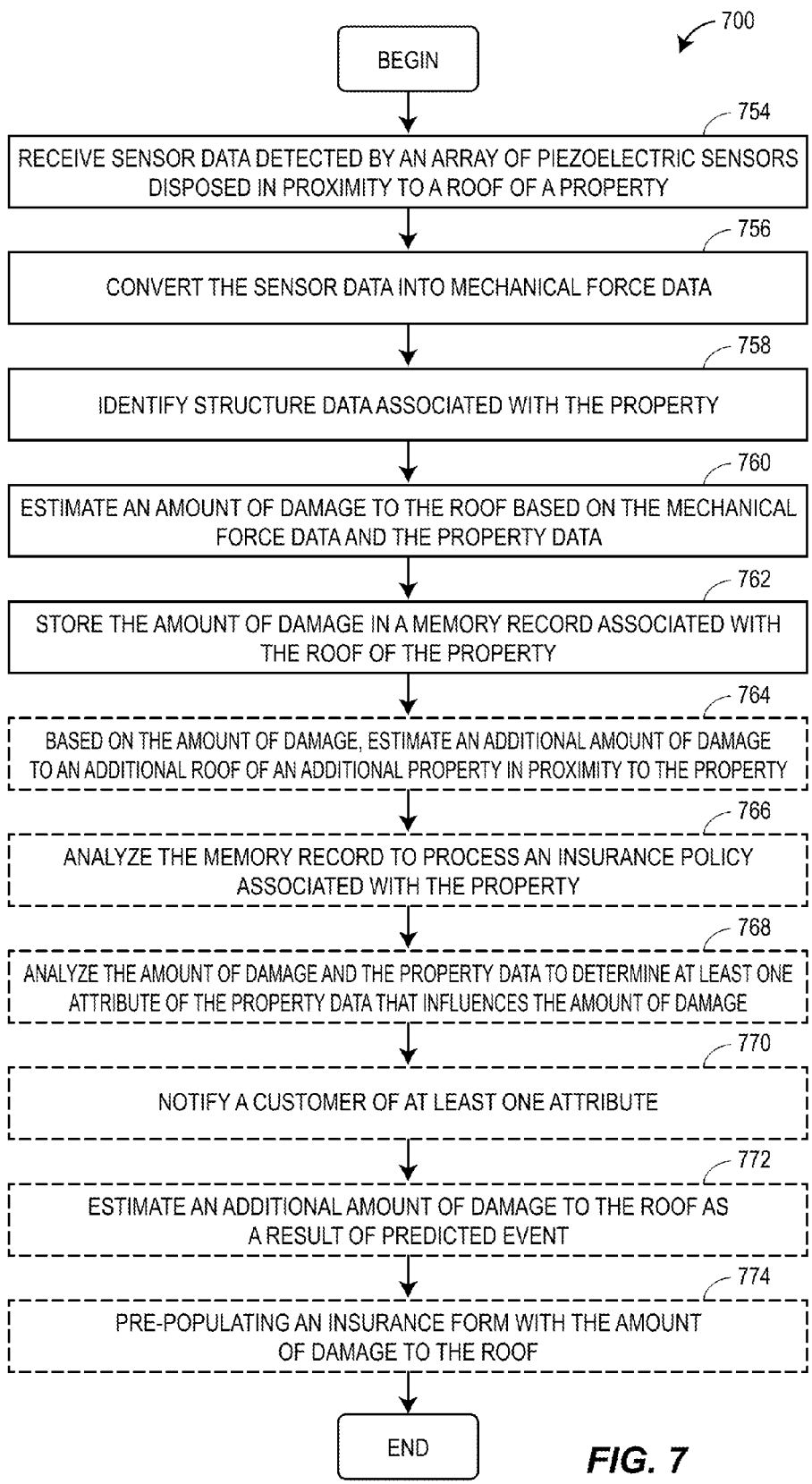
FIG. 7 depicts a flow diagram of detecting property damage and estimating an amount of the damage, in accordance with some embodiments.

Referring to FIG. 7, depicted is a flow diagram of an example damage estimation technique 700 implemented by a processing server, such as the processing server 215 as discussed with respect to FIG. 2. The processing server may implement the technique 700 to estimate an amount of damage to a roof of a property resulting from a loss event. However, it should be appreciated that the processing server may estimate damage to other various portions of various properties in a similar manner. According to embodiments, the processing server may be associated with an insurance provider.

The processing server can receive (block 754) sensor data detected by an array of piezoelectric sensors disposed in proximity to a roof of a property. The sensor data can include analog voltage measurements generated by the piezoelectric sensors in response to detecting a physical force. The processing server can receive the sensor data directly from the sensor array or from other sources. The processing server can convert (block 756) the sensor data into mechanical force data. In particular, the processing server can convert the voltage measurements into a resistance measurement, then into a conductance measurement, and then into mechanical force data.

The processing server can identify (block 758) property data associated with the property. In some embodiments, the property data can be stored in a local or remote memory device. In other embodiments, the processing server may receive the property data from the sensor array or from another component or entity. The property data can include a date of construction, a type of roof material, a construction technique, an age of the property, a location of the property, a pitch of the roof, a size of the roof, and/or other data. The processing server can estimate (block 760) an amount of damage to the roof based on the mechanical force data and the property data. In embodiments, the processing server may use one or more techniques or algorithms to estimate the amount of damage. For example, a certain mechanical force measurement may correspond to a certain estimated amount of damage. In some embodiments, the processing server may extrapolate the calculated mechanical force data to account for a surface area of the roof (which may be contained in the property data, in embodiments). In some embodiments, the processing server may not estimate the amount of damage and may instead receive the estimated amount of damage directly from the sensor array (or from other sources). The processing server can store (block 762) the amount of damage in a memory record associated with the roof of the property. In embodiments, the memory record may include a listing of estimated damage amounts that the processing server (or another component) has calculated over a period of time.

The processing server can optionally perform various applications using the estimated amount of damage. In one case, the processing server can, based on the amount of damage, estimate (block 764) an additional amount of damage to an additional roof of an additional property in proximity to the property. In some embodiments, the additional property has an insurance policy with the insurance provider. Further, the processing server can define the proximity according to a threshold value. The processing server can also analyze (block 766) the memory record associated with the roof of the property to process an insurance policy associated with the property. In particular, the processing server can generate a proposed insurance policy, recommend increasing coverage on an existing insurance policy, or perform other processing functionalities.

The processing server can also analyze (block 768) the amount of damage and the property data to determine at least one attribute of the property that influences the amount of damage. For example, the processing server may determine that asphalt shingle roofing experiences a lesser amount of damage from a hailstorm than does a tile roof. The processing server can leverage existing or additional data for this analysis. The processing server can further notify (block 770) a customer of the at least one attribute. Continuing with the example, the processing server can communicate a suggestion that switching from a tile roof to asphalt shingles may decrease subsequent damage to the roof.

The processing server can estimate (772) an additional amount of damage to the roof as a result of a predicted event. In particular, the processing server can interface with one or more third-party servers to retrieve data related to any upcoming or forecasted weather events. Based on any historical damage data associated with the roof of the property, the processing server can estimate an amount of damage that may result from the upcoming or forecasted weather event. The processing server can scale up or down resources accordingly to manage the weather event and/or any claims processing that may result from the weather event. In further embodiments, the processing server can pre-populate (block 774) an insurance form with the amount of damage to the roof so that a customer having an insurance policy for the property need not initiate the claims process.

Figure 8:
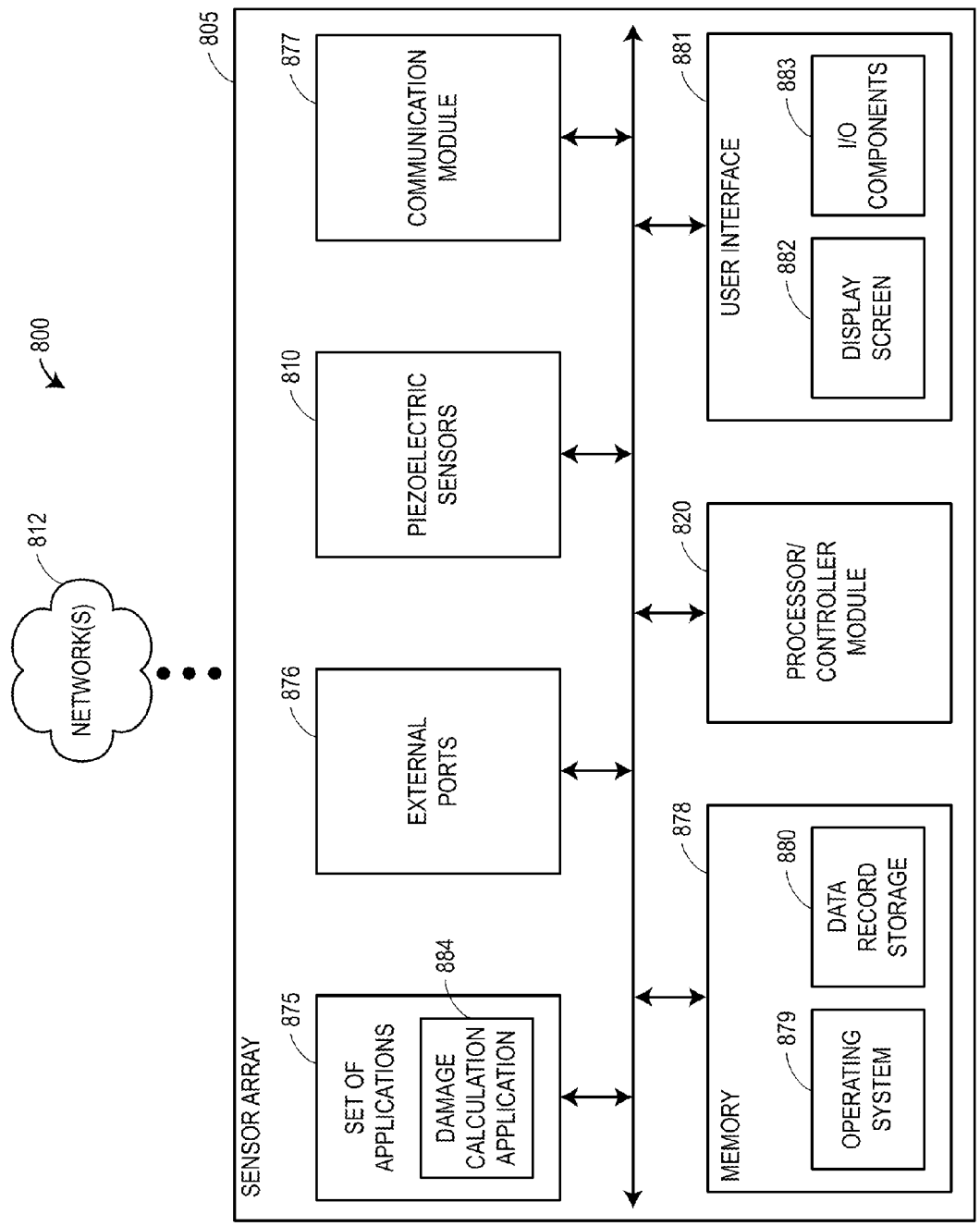
FIG. 8 is a block diagram of a sensor array in accordance with some embodiments.

FIG. 8 illustrates a diagram of an example sensor array 805 (such as the sensor array 205 as discussed with respect to FIG. 2) in which the functionalities as discussed herein may be implemented. As described herein, the sensor array 805 may be located or disposed in proximity to a roof of a property.

The sensor array 805 can include a processor/controller module 820 as well as a memory 878. The memory 878 can store an operating system 879 capable of facilitating the functionalities as discussed herein as well as a set of applications 875 (i.e., machine readable instructions). For example, one of the set of applications 875 can be a damage calculation application 884. The damage calculation application 884 can facilitate functionalities associated with estimating the amount damage to the roof. In particular, the damage calculation application 884 can collect sensor data from a set of piezoelectric sensors 810, calculate mechanical force data from the sensor data, and use the mechanical force data to estimate an amount of damage to the roof of the property. The processor 820 can interface with the memory 878 to execute the operating system 879 and the set of applications 875. According to embodiments, the memory 878 can also include a data record storage 880 that stores memory records associated with instances in which damage to the roof was estimated. The memory 878 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The sensor array 805 can further include a communication module 877 configured to communicate data via one or more networks 812. According to some embodiments, the communication module 877 can include one or more transceivers (e.g., WWAN, WLAN, and/or WPAN transceivers) functioning in accordance with IEEE standards, 3GPP standards, or other standards, and configured to receive and transmit data via one or more external ports 876. For example, the communication module 877 can send raw sensor data and/or calculated damage amounts to a remote server via the network 812. The sensor array 805 may further include a user interface 881 configured to present information to a user and/or receive inputs from the user. As shown in FIG. 8, the user interface 881 includes a display screen 882 and I/O components 883 (e.g., ports, capacitive or resistive touch sensitive input panels, keys, buttons, lights, LEDs, speakers, microphones). According to embodiments, the user may access the sensor array 805 via the user interface 881 to process sensor data and/or perform other functions.

Figure 9:
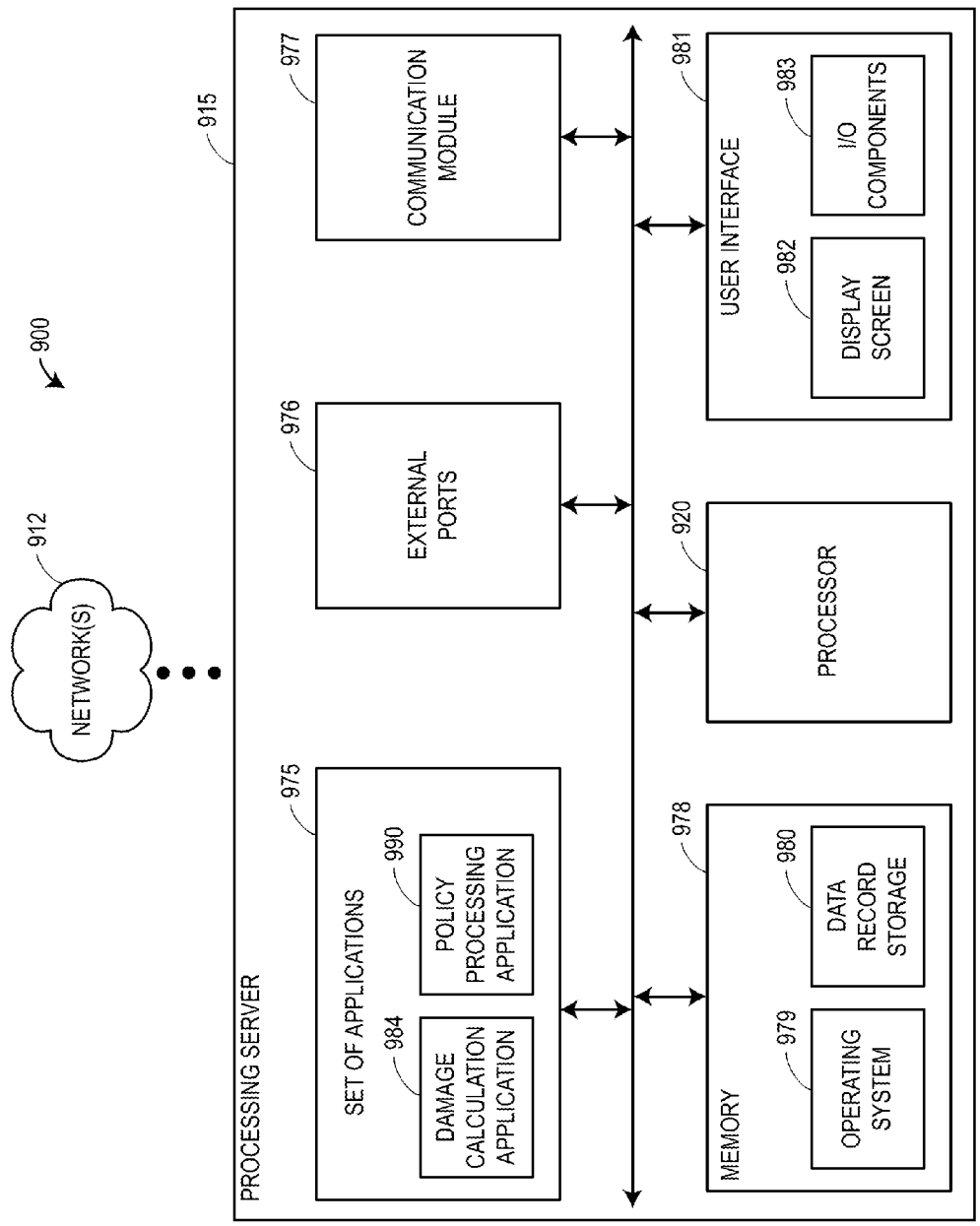
FIG. 9 is a block diagram of a processing server in accordance with some embodiments.

FIG. 9 illustrates a diagram of an example processing server 915 (such as the processing server 215 as discussed with respect to FIG. 2) in which the functionalities as discussed herein may be implemented. It should be appreciated that the processing server 915 can be associated with an insurance provider, as discussed herein.

The processing server 915 can include a processor 920 as well as a memory 978. The memory 978 can store an operating system 979 capable of facilitating the functionalities as discussed herein as well as a set of applications 975 (i.e., machine readable instructions). For example, one of the set of applications 975 can be a damage calculation application 984 and another of the set of applications 975 can be a policy processing application 990. The damage calculation application 984 can facilitate functionalities associated with estimating the amount damage to the roof. In particular, the damage calculation application 984 can receive sensor data from a set of piezoelectric sensors, calculate mechanical force data from the sensor data, and use the mechanical force data to estimate an amount of damage to the roof of the property. The policy processing application 990 can process various insurance policies or perform other functionalities that incorporate the estimated amount of damage.

The processor 920 can interface with the memory 978 to execute the operating system 979 and the set of applications 975. According to embodiments, the memory 978 can also store a data record storage 980 that stores memory records associated with instances in which damage to the roof was estimated, as well as other data related to insurance policies. The memory 978 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 915 can further include a communication module 977 configured to communicate data via one or more networks 912. According to some embodiments, the communication module 977 can include one or more transceivers (e.g., WWAN, WLAN, and/or WPAN transceivers) functioning in accordance with IEEE standards, 3GPP standards, or other standards, and configured to receive and transmit data via one or more external ports 976. For example, the communication module 977 can receive sensor data and/or third-party data from various sources via the network 912. The processing server 915 may further include a user interface 981 configured to present information to a user and/or receive inputs from the user. As shown in FIG. 9, the user interface 981 includes a display screen 982 and I/O components 983 (e.g., ports, capacitive or resistive touch sensitive input panels, keys, buttons, lights, LEDs, speakers, microphones). According to embodiments, the user may access the processing server 915 via the user interface 981 to process insurance policies and/or perform other functions. In some embodiments, the processing server 915 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 920 (e.g., working in connection with the operating system 979) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "sensing," "converting," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A method of detecting damage to a property, the method comprising:
    collecting sensor data from at least one sensor included in a sensor array of a specified area, the sensor array disposed in proximity to a portion of the property, the sensor data corresponding to an electrical charge generated by the at least one sensor in response to a physical force exerted on the portion of the property;
    converting the sensor data into mechanical force data;
    receiving, via near field communication (NFC) from an NFC data tag disposed in proximity to the roof of the property, data indicative of a surface area of the portion of the property;
    identifying a ratio between the specified area of the sensor array and the surface area of the portion of the property;
    calculating a total amount of mechanical force exerted on the portion of the property by multiplying the mechanical force data by the ratio between the specified area of the sensor array and the surface area of the portion of the property;
    estimating, by a processor, an amount of damage to the portion of the property based on the total amount of mechanical force;
    storing the amount of damage in a memory device until a network connection to a server is detected;
    detecting the network connection to the server; and
    responsive to detecting the network connection, automatically transmitting the amount of damage to the server via the network connection.

2. The method of claim 1, wherein the portion is a roof, and wherein estimating the amount of damage to the roof of the property comprises:
    estimating the amount of damage to the roof based on the total amount of mechanical force and property data including at least one of: a date of construction, a type of roof material, a construction technique, an age of the structure, a location of the structure, a pitch of the roof, or a size of the roof.

3. The method of claim 1, further comprising:
    storing the amount of damage in a memory record associated with the portion of the property.

4. A system for detecting damage to a portion of a property, comprising:
    a sensor array of a specified area disposed in proximity to the portion of the property and including at least one sensor configured to:
        detect a physical force exerted on the portion of the property, and
        generate an electrical charge corresponding to the physical force;
    a communication module configured to connect to a remote server via a network connection;
    a memory storing a set of instructions;
    a processor adapted to interface with the at least one sensor, the communication module, and the memory, and configured to execute the set of instructions to:
        retrieve sensor data from the at least one sensor, the sensor data corresponding to the electrical charge generated by the at least one sensor,
        convert the sensor data into mechanical force data,
        receive, via near field communication (NFC) from an NFC data tag disposed in proximity to the roof of the property, data indicative of a surface area of the portion of the property, identify a ratio between the specified area of the sensor array and the surface area of the portion of the property, calculate a total amount of mechanical force exerted on the portion of the property by multiplying the mechanical force data by the ratio between the specified area of the sensor array and the surface area of the portion of the property, estimate an amount of damage to the portion of the property based on the total amount of mechanical force, cause the memory to store the amount of damage in a memory record associated with the portion of the property until the network connection to the remote server is detected, detect the network connection to the remote server, and responsive to detecting the network connection, cause the communication module to automatically transmit the amount of damage to the remote server via the network connection.

5. The system of claim 4, wherein the portion is a roof, and wherein the processor is configured to execute the set of instructions to:

estimate the amount of damage to the roof based on the total amount of mechanical force and property data comprising at least one of: a date of construction, a type of roof material, a construction technique, an age of the structure, a location of the structure, a pitch of the roof or a size of the roof.

6. The system of claim 4, wherein the at least one sensor is arranged as an array of piezoelectric sensors.

7. The system of claim 6, wherein the array of piezoelectric sensors comprises an amount of piezoelectric sensors in a range of twenty (20) to thirty (30).

8. The system of claim 4, further comprising:

an enclosure secured to a surface of the portion of the property, wherein the at least one sensor is contained within the enclosure.

* * * * *